United States Patent
Drogichen et al.

(10) Patent No.: US 6,898,728 B2
(45) Date of Patent: *May 24, 2005

(54) SYSTEM DOMAIN TARGETED, CONFIGURABLE INTERCONNECTION

(75) Inventors: Daniel P. Drogichen, Leucadia, CA (US); Andrew E. Phelps, Encinitas, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 570 days.

This patent is subject to a terminal disclaimer.

(21) Appl. No.: 09/963,891

(22) Filed: Sep. 25, 2001

(65) Prior Publication Data

US 2003/0061534 A1 Mar. 27, 2003

(51) Int. Cl.[7] .................................................. G06F 11/00
(52) U.S. Cl. .......................................... 714/4; 370/225
(58) Field of Search ............................... 714/3, 4, 5, 9, 714/10, 13; 370/217, 218, 225; 713/100

(56) References Cited

U.S. PATENT DOCUMENTS

| | | | | |
|---|---|---|---|---|
| 5,361,249 | A | * 11/1994 | Monastra et al. | 370/217 |
| 5,471,460 | A | * 11/1995 | Tanabe | 370/218 |
| 5,991,892 | A | * 11/1999 | Honda | 714/4 |
| 6,308,286 | B1 | * 10/2001 | Richmond et al. | 714/13 |
| 6,748,429 | B1 | 6/2004 | Talluri et al. | |
| 6,757,243 | B1 | 6/2004 | Chaudhuri et al. | |
| 2001/0056553 | A1 | * 12/2001 | Suzuki et al. | 714/4 |
| 2002/0163881 | A1 | * 11/2002 | Dhong et al. | 370/225 |
| 2003/0061476 | A1 | * 3/2003 | Phelps et al. | 713/100 |
| 2003/0088808 | A1 | * 5/2003 | Phelps et al. | 714/25 |

OTHER PUBLICATIONS

"Sun Enterprise™ 10000 Server: Dynamic System Domains", Technical White Paper, Sun Microsystems, Inc. Palo Alto, CA, 1999.

\* cited by examiner

*Primary Examiner*—Scott Baderman
*Assistant Examiner*—Joshua Lohn
(74) *Attorney, Agent, or Firm*—Meyertons Hood Kivlin Kowert & Goetzel, P.C.; B. Noël Kivlin (57) ABSTRACT

A method and apparatus for reconfiguring a computing system on a system domain-by-system domain basis are disclosed. In one aspect of the present invention, the apparatus is a computing system comprises a plurality of system domains, a centerplane interconnecting the system domains, and a system controller. The system controller is capable of detecting a condition triggering a reconfiguration and reconfiguring a signal path affected by the condition from a first mode to a second mode. In a second aspect of the present invention, the method for reconfiguring a signal path in a computing system including a plurality of system domains comprises: detecting a condition triggering a reconfiguration of the computing system; reconfiguring a signal path affected by the condition from a first mode to a second mode responsive to detecting the condition; leaving the unaffected system domains configured in the first mode; and operating the affected system domains in the second mode and the unaffected system domains in the first mode.

27 Claims, 6 Drawing Sheets

SYSTEM DOMAIN TARGETED, CONFIGURABLE INTERCONNECTION

BACKGROUND OF THE INVENTION

1. Field of the Invention

The present invention pertains to the configuration of computing systems and, more particular, to a technique for configuring interconnections in a computing system on a system domain-by-system domain basis.

2. Description of the Related Art

The last several years have witnessed an increased demand for network computing, partly due to the emergence of the Internet. Some of the notable trends in the industry include a boom in the growth of Applications Service Providers ("ASPs") that provide applications to businesses over networks and enterprises that use the Internet to distribute product data to customers, take orders, and enhance communications with employees.

Businesses typically rely on network computing to maintain a competitive advantage over other businesses. As such, developers, when designing processor-based systems for use in network-centric environments, consider several factors to meet the expectation of the customers. The factors may include, for example, functionality, reliability, scalability, and performance of such systems.

One example of a processor-based system used in a network-centric environment is a mid-range server system. A single mid-range server system may have a plurality of system boards that may, for example, be configured as one or more system domains, where a system domain, for example, may act as a separate machine by running its own instance of an operating system to perform one or more of the configured tasks.

The benefits of providing substantially independently operating system domains within an integrated system become readily apparent as customers are able to perform a variety of tasks that would otherwise be reserved for several different machines. However, managing a plurality of system domains within a system sometimes proves to be a challenging task, as designers of such systems have a finite number of resources to build a functioning system that also meets customer demands. For example, managing one or more system domains in a system may consume valuable hardware resources that could otherwise be used to deliver additional features to the customers.

The present invention is directed to resolving, or at least reducing, one or all of the problems mentioned above.

SUMMARY OF THE INVENTION

The invention is a method and apparatus for reconfiguring a computing system on a system domain-by-system domain basis. In one aspect of the present invention, the apparatus is a computing system comprises a plurality of system domains, a centerplane interconnecting the system domains, and a system controller. The system controller is capable of detecting a condition triggering a reconfiguration and reconfiguring a signal path affected by the condition from a first mode to a second mode. In a second aspect of the present invention, the method for reconfiguring a signal path in a computing system including a plurality of system domains comprises: detecting a condition triggering a reconfiguration of the computing system; reconfiguring a signal path affected by the condition from a first mode to a second mode responsive to detecting the condition; leaving the unaffected system domains configured in the first mode; and operating the affected system domains in the second mode and the unaffected system domains in the first mode.

BRIEF DESCRIPTION OF THE DRAWINGS

The invention may be understood by reference to the following description taken in conjunction with the accompanying drawings, in which like reference numerals identify like elements, and in which:

FIG. 3A to FIG. 3D illustrate a configurable interconnect in the computing system of FIG. 1 and FIG. 2 constructed and operated in accordance with one embodiment of the present invention;

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 1:
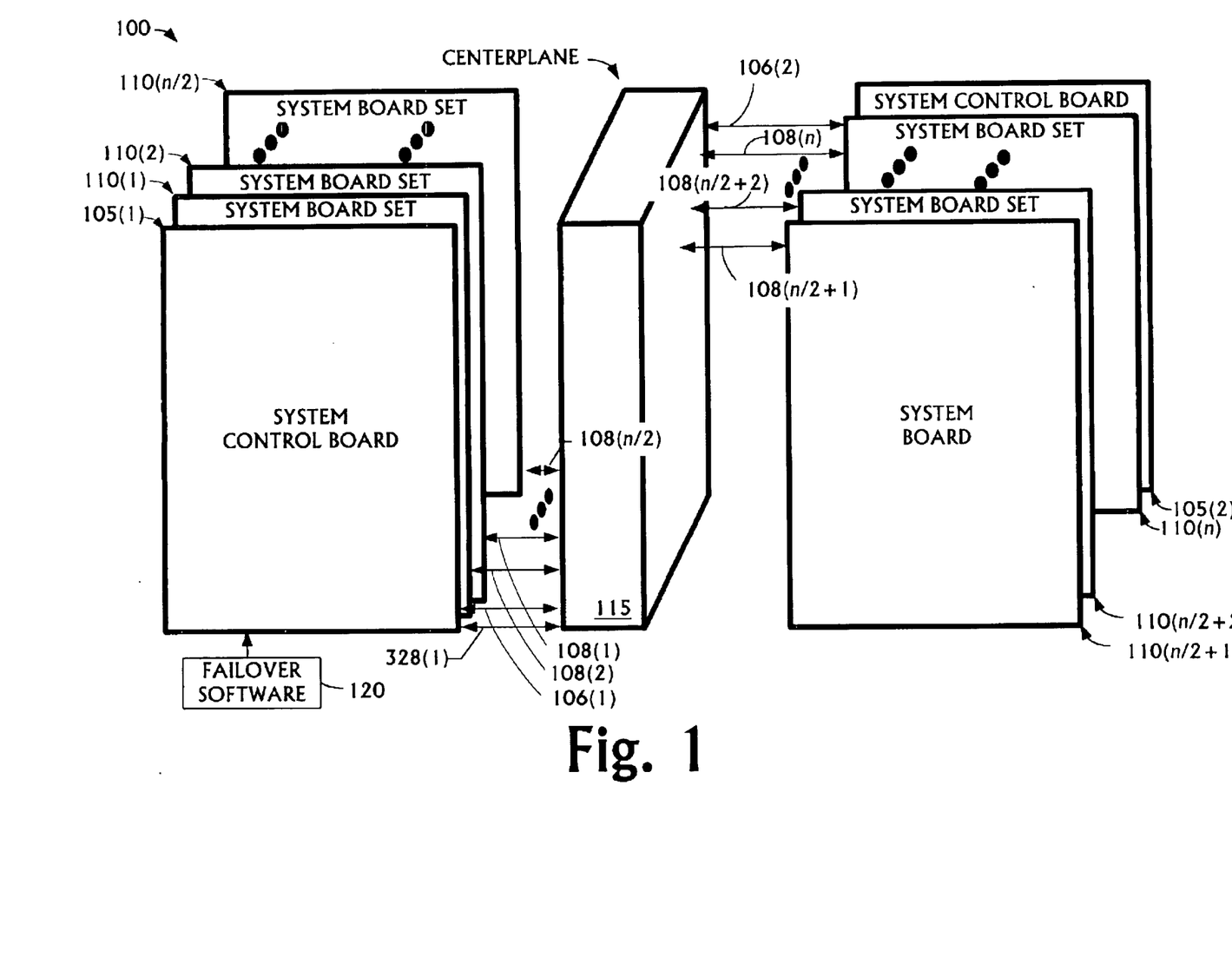
FIG. 1 shows a stylized block diagram of a computing system in accordance with one embodiment of the present invention.

Referring now to FIG. 1, a block diagram of a computing system 100 in accordance with one embodiment of the present invention is illustrated. The computing system 100 includes a plurality of system control boards 105(1), 105(2) and a plurality of system board sets 110(1)–110(n) coupled to a centerplane 115. For illustrative purposes, lines 106(1), 106(2) and lines 108(1)–108(n) are utilized to show that the system control boards 105(1), 105(2) and system board sets 110(1)–110(n), respectively, are coupled to the centerplane 115. However, as will be appreciated by those skilled in the art having the benefit of this disclosure, the system control boards 105(1), 105(2) and system board sets 110(1)–110(n) may be coupled to the centerplane 115 in any of a variety of ways. These ways include, but are not limited to, edge connectors, cables, or other available interfaces. The system board sets 110(1)–110(n) may interface with the centerplane 115 using the same technique as the system control boards 105(1), 105(2), but this is not necessary to the practice of the invention. The system control boards 105(1), 105(2) and the system board set sets 110(1)–110(n) may be connected to the centerplane 115 using different types of interfaces.

In the illustrated embodiment, one of the control boards 105(1), 105(2) manages the overall operation of the computing system 100 and the other provides redundancy and automatic failover in the event that the first board fails. During any given moment, generally only one of the two system control boards 105(1), 105(2) actively controls the overall operations of the computing system 100. Accordingly, the term "active system control board," as utilized hereinafter, may refer to either one of the system control boards 105(1), 105(2), depending on the board that is managing the operations of the computing system 100 at that moment. For the illustrated embodiment, the system control board 115(1) is the "active" system control board and the system control board 115(2) is the "inactive" system control board. The active system control board 105(1) is generally responsible for providing system controller resources for the computing system 100.

The centerplane 115 serves as a communications conduit for the system board sets 110(1)–110(n), half of which may be connected on one side of the centerplane 115 and the other half on the opposite side of the centerplane 115. The centerplane 115 may be an n×n crossbar switch that allows up to n system board sets 110(1)–110(n) and the system control boards 105(1), 105(2) to communicate with one another, if desired. In one particular embodiment, n=18. Thus, the centerplane 115 permits the two system control boards 105(1), 105(2) to communicate with each other and the system board sets 110(1)–110(n). The centerplane 115 also permits the system board sets 110(1)–110(n) to communicate with each other. The system control boards 105(1), 105(2) may use any suitable communications protocol connection known to the art through the centerplane 115 to communicate with one or more of the system board sets 110(1)–110(n).

In accordance with one particular embodiment of the present invention, the active system control board 105(1) partitions the resources of the system board sets 110(1)–110(n) into a plurality of "system domains." This partitioning process includes defining one or more domains and then configuring the resources of the system board sets 110(1)–110(n) to meet the definition. Such partitioning techniques are known in the art, and any suitable technique may be used. One such suitable technique is disclosed and claimed in U.S. Pat. No. 5,931,938, entitled "Multiprocessor Computer Having Configurable Hardware System Domains," issued Aug. 3, 1999, to Sun Microsystems, Inc. as assignee of the inventors Daniel P. Drogichen, et al.

Figure 2:
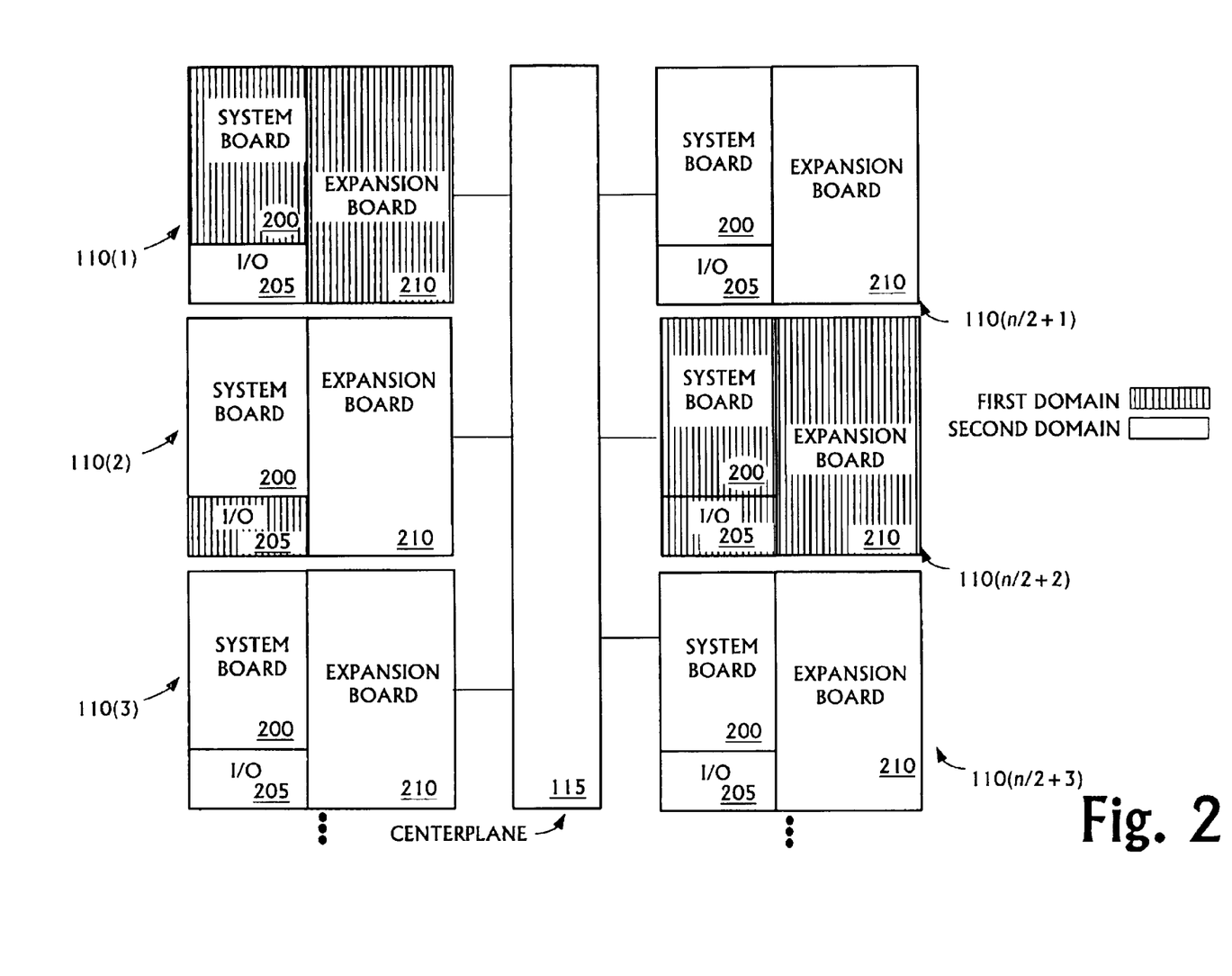
FIG. 2 illustrates a block diagram of an exemplary system domain configuration that may be employed in the system of FIG. 1, in accordance with one embodiment of the present invention.

Turning now to FIG. 2, each system board set 110(1)–110(n), in the illustrated embodiment, comprises one or more component boards, including a system board 200, an input/output ("I/O") board 205, and an expansion board 210. Note that alternative embodiments might not employ board "sets" or, alternatively, employ board sets with differing numbers of boards. As those in the art having the benefit of this disclosure will appreciate, the functionality of one or more of the system board 200, I/O board 205, and expansion board 210 might be incorporated onto a single board. Conversely, that functionality may be spread across any number of boards that can be interconnected in the manner shown.

Thus, the number of component boards in the board sets 110(1)–110(n) may range from 1 on up to any number. Again, as those in the art having the benefit of this disclosure will appreciate, there is a practical upper bound to this number. The upper bound generally arises from the fact that greater numbers of boards tend to degrade performance, complicate serviceability, and compromise reliability. However, this is an implementation specific concern. From the standpoint of the invention, the number of component boards in the board sets 110(1)–110(n) is immaterial.

The system board 200 may include processors (not shown), as well as memories (also not shown), for executing applications, including portions of an operating system. The processors may be, for example, UltraSPARC™ 64-bit processors available from Sun Microsystems, any of the Itanium™, Pentium™, or Alpha™-class processor from Intel Corporation, or the Athlon™ or Duron™-class processors from Advanced Micro Devices, Inc. In one particular implementation, the computing system 100 employs an UNIX™-based operating system (e.g., a Solaris™ OS) commercially available from Sun Microsystems, Inc. However, the invention may be employed with virtually any operating system. The I/O board 205 may manage I/O cards, such as peripheral component interface cards (not shown) and optical cards (also not shown), that are installed in the computing system 100. The expander board 210, in the illustrated embodiment, generally acts as a multiplexer (e.g., 2:1 multiplexer) to allow both the system and I/O boards 200, 205 to interface with the centerplane 115, which, in some instances, may have only one slot for interfacing with both boards 200, 205.

In the illustrated embodiment, the computing system 100 is dynamically subdivided into a plurality of system domains, although the invention is not so limited. Each domain may have a separate boot disk (to execute a specific instance of the operating system, for example), separate disk storage, network interfaces, and/or I/O interfaces. System domains are a mix of I/O assemblies and CPU/memory resources. System domains are isolated from failures (e.g., operating system errors, _("SW") errors, CPU/memory failures, I/O assembly failures, and other hardware failures) in other system domains. Each domain may operate as a separate machine that performs a variety of user-configured services. For example, one or more domains may be designated as an application server, a web server, database server, and the like. Each domain may run its own operating system and may be reconfigured without interrupting the operation of other domains.

FIG. 2 illustrates an exemplary arrangement wherein at least two domains are defined in the computing system 100 in the illustrated embodiment. The first domain, identified by vertical cross-sectional lines, includes the system board set 110(n/2+2), the system board 200 of the system board set 110(1), and the I/O board 205 of the system board set 110(2). The second domain in the illustrated embodiment includes the system board sets 110(3), 110(n/2+1), and 110(n/2+3), as well as the I/O board 205 of the system board set 110(1) and the system board 200 of the system board set 110(2).

In the illustrated embodiment, a domain may be formed of an entire system board set 110(1)–110(n), one or more boards (e.g., system board 200, I/O board 205) from selected system board sets 110(1)–110(n), or a combination thereof. Although not necessary, it may be possible to define each system board set 110(1)–110(n) as a separate domain. For example, if each system board set 110(1)–110(n) were its own domain, the computing system 100 may conceivably have up to "n" (i.e., the number of system board sets) different domains. When two boards (e.g., system board 200, I/O board 205) from the same system board set 110(1)–110(n) are in different domains, such a configuration is referred to as a "split" or "split expander" configuration. The expander board 210 of the system board sets 110(1)–110(n) keep the transactions separate for each domain. Physical proximity is not required for boards in a system domain.

Note, however, that the invention is not limited to computing systems in which the formation of system domains is performed dynamically. For example, some embodiments may restrict the allocation of system resources to various system domains only upon reset of the entire computing system, i.e., not dynamically. Furthermore, resources may be allocated to system domains either manually or autonomously, i.e., under the automated control of one or more of the system control boards 105(1), 105(2). The manner in which system domains are created or deleted and the manner in which resources are allocate or re-allocated to existing system domains is not material to the practice of the present invention.

Figures 3A, 3D:
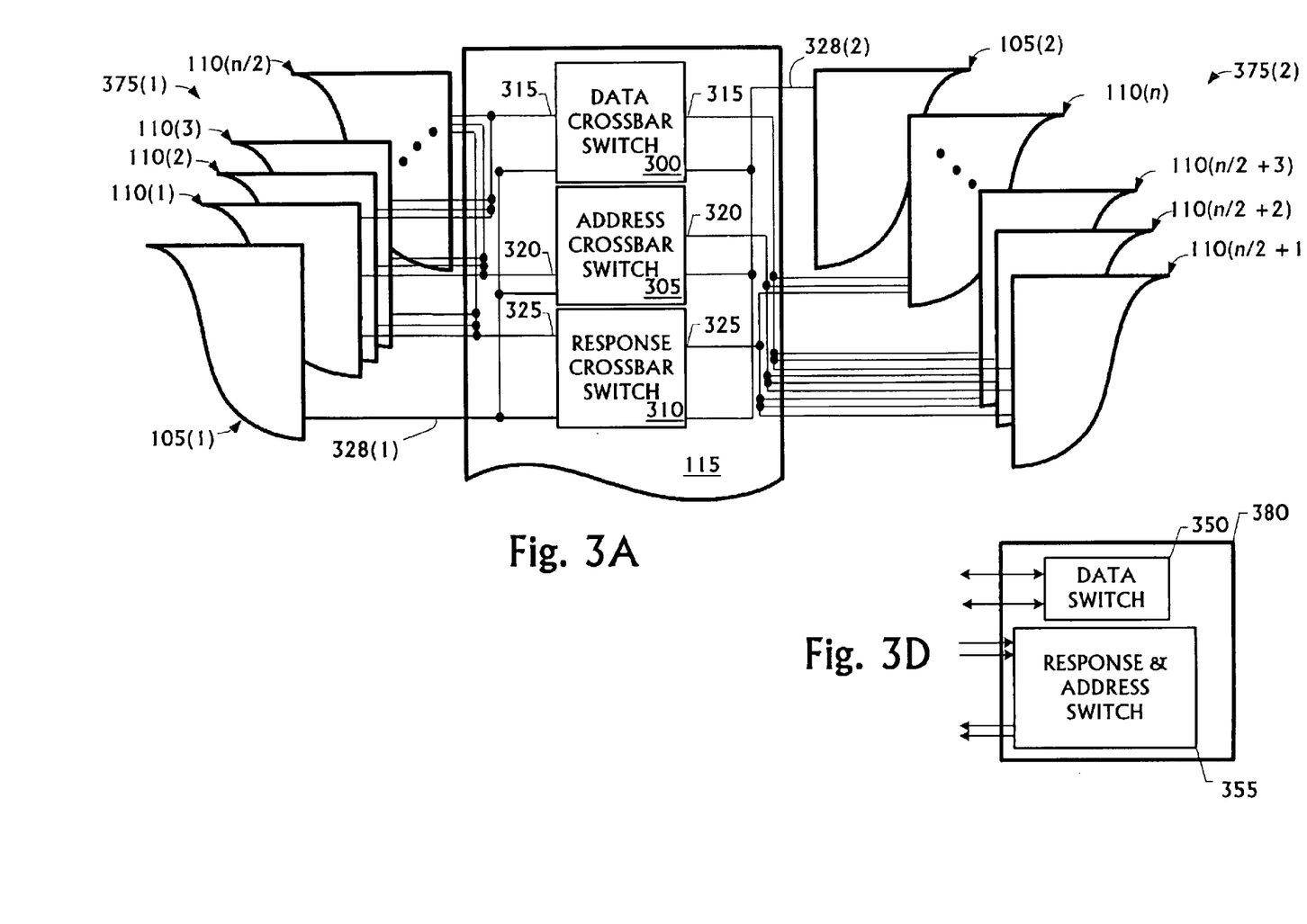

Returning to FIG. 1, communications among the resources of the system board sets 110(1)–110(n) are performed through the centerplane 115. The centerplane 115 provides a point to point interconnect for each system board set 110(1)–110(n) to every other system board set 110(1)–110(n) in the computing system 100. To more concretely illustrate this interconnection, one particular implementation of the computing system 100 is shown in FIG. 3A. Note that, in the implementation illustrated in FIG. 3A, the computing system 100 is partitioned into two system domains 375(1), 375(2), comprising system board sets 110(1)–110(n/2) and 110(n/2+1)–110(n), respectively. The two system domains 375(1), 375(2) communicate with one another over the separate data, address, and response interconnects through the centerplane 115 as is discussed more fully below.

Still referring to FIG. 3A, the centerplane 115, in the illustrated embodiment, includes a data crossbar switch 300, an address crossbar switch 305, and a response crossbar switch 310 for transmitting respective data, address, and response signals among the system domains defined from the system board sets 110(1)–110(n). More particularly, the data crossbar switch 300 and the lines 315 comprise a data interconnect; the address crossbar switch 305 and the lines 320 comprise an address interconnect; and, the response crossbar switch 310 and the lines 325 comprise a response interconnect. Thus, the centerplane 115 includes three crossbar switches 300, 305, 310 that provide a separate data interconnect, address interconnect, and response interconnect to allow intra-domain and inter-domain communications. Note also that the address, data, and response interconnects illustrated in FIG. 3A actually are collections of many individual signal paths. Each of the address, data, and response paths is many bits wide. For instance, in one particular embodiment, the data interconnect is 288-bits wide, the address interconnect is 148-bits wide, and the response interconnect is 66-bits wide. Thus, each line 315, 320, 325 is many bits wide.

Each individual signal path in the data, response, and address interconnects comprises two halves. In its "normal" mode of operation, the computing system 100 separates the information (i.e., data and/or control information) for any given transaction into two messages and transmits the two messages in parallel on the two halves of the respective individual signal path. In accordance with the invention, the computing system 100 enters a "degraded mode," of operation discussed more fully below, upon the detection of a predetermined condition, such as a failure. In the degraded mode of the illustrated embodiment, all of the information is transmitted on a single half of the path. While this takes twice as many cycles as in normal mode, the computing system 100, as a whole, is not required to shut down or reset.

Figure 3B:
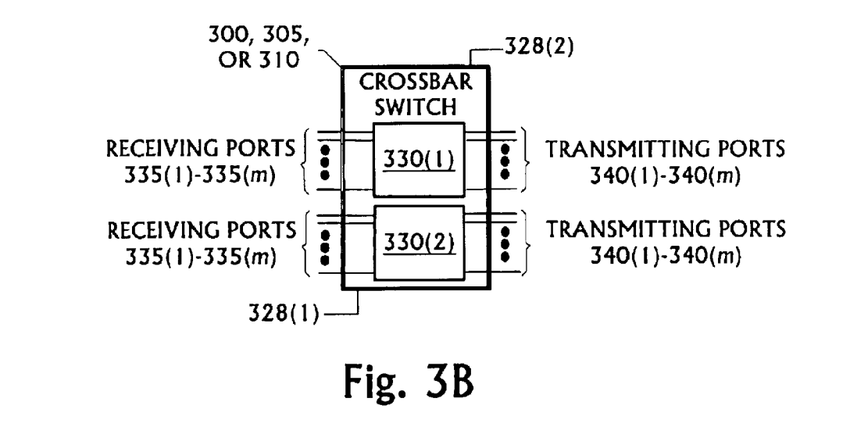

Turning now to FIG. 3B, each crossbar switch 300, 305, 310 therefore includes two halves 330(1), 330(2). Each half 330(1), 330(2) is implemented by one or more application specific integrated circuits ("ASICs") (not shown). Each half 330(1), 330(2) has n receiving ports 335(1)–335(n) and n transmitting ports 340(1)–340(n). Thus, if there are 18 system board sets 110(1)–110(n), each half 330(1), 330(2) would include 18 receiving ports 335 and 18 transmitting ports 340. Each of the ports 335(1)–335(n), 340(1)–340(n) is half as many bits wide as the individual signal path, as each half 330(1), 320(2) handles information on half the individual signal path.

Figure 3C:
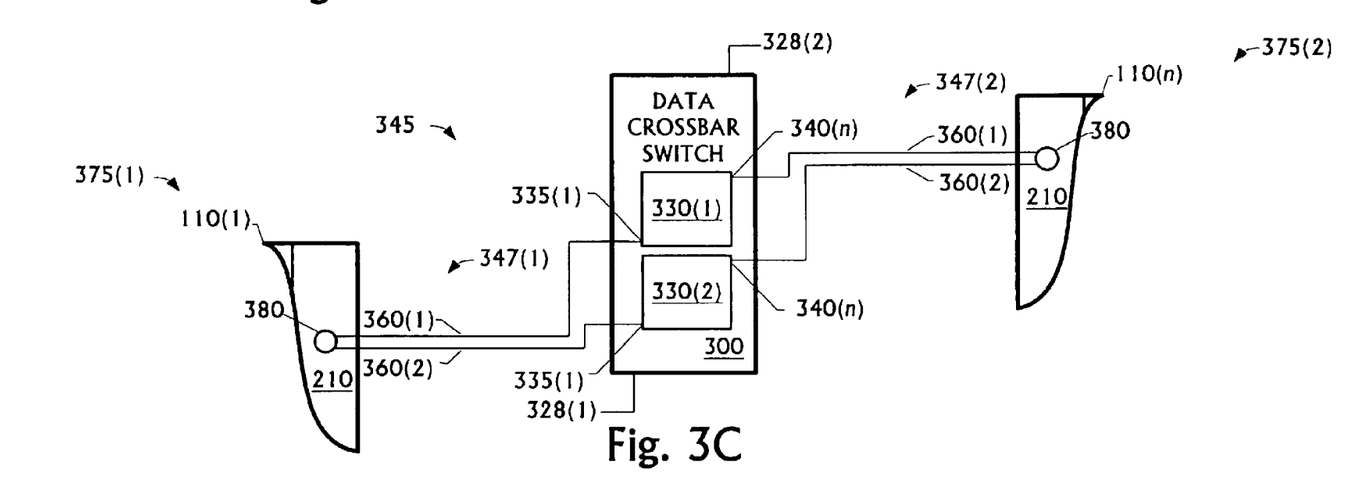

Consider, for the sake of illustration, the inter-domain communication scenario on the portion of the data interconnect 345 shown in FIG. 3C. More particularly, FIG. 3C illustrates a portion of a data interconnect 345. In this scenario, a data transaction is occurring between the system board set 110(1) and the system board set 110(n) over two individual data signal paths 347(1), 347(2) and across the data crossbar switch 300. Thus, for present purposes, the system board sets 110(1), 110(2) can be considered a "set of communicating system board sets" ("SOCSBS"). For any configuration of the system, a SOCSBS is (loosely) a set of system board sets 110(1)–110(n) that are able to send messages to each other.

The individual data signal paths 347(1), 347(2) between the switches 380 on the expansion boards 210 of the system board sets 110(1), 110(n) to the data crossbar switch 300. Thus, FIG. 3C actually shows two data signal paths 347(1), 347(2). Each expansion board 210, in this particular embodiment, includes a switch 380 through which transactions are sent and received in a manner discussed more fully below. Each signal path, whether it be a data signal path, an address signal path, or a response signal path extends from a switch 380 on one of the expansion boards 210 of one of the system board sets 110(1)–110(n) to a crossbar switch 300, 305, or 310 of the centerplane 115. The address and response interconnects are structured similarly to the data interconnect except for certain changes, e.g., the address crossbar switch 305 or the response crossbar switch 310 is used instead of the data crossbar switch 300.

Each switch 380, in the illustrated embodiment includes, as is shown in FIG. 3D, a data switch 350 and a response/address switch 355 that handles information received over the respective response, data, and address interconnects. Thus, the switch 380 handles all signal path transactions for its respective system board set 110(1)–110(n). Note that the number of these switches in the switch 380 is not material to the invention, and that any number from 1 to 3 may be employed. The data switch 350 and the response/address switch 355 are implemented in ASICs (not shown) that are also configurable over the console connections 328(1), 328(2).

Each of the data switch 350 and the response/address switch 355 receive and transmit signals through a plurality of multiplexers (not shown). When the computing system 100 operates in a normal mode, the information for any given transaction is separated into two portions, each packaged with a common header (not shown) in a respective message. Each message is then transmitted over a respective half of the individual signal path (including a respective half 330(1), 330(2) of the respective crossbar switch 300, 305, or 310) from one switch 380 to the other switch 380 through the respective multiplexers.

The number and type of signal paths, e.g., the individual data signal path 345 in FIG. 3C, will be implementation specific. In the illustrated embodiment, there are three separate kinds of signal paths, i.e., data, address and response. There is one signal path of each kind between each expander board 210 of each system board set 110(1). Thus, there are (3×n) signal paths in the illustrated embodiment. In one implementation, n=18, yielding a total of 54 signal paths. However, the number may vary depending on the number of kinds of signal paths and the number of expansion boards 210.

Returning to FIG. 3A, the system control boards 105(1) and 105(2) are not on the data, address, or response interconnects. The system control boards 105(1) and 105(2) instead connect to the crossbar switches 300, 305, 310 on console connections 328(1) and 328(2), respectively. The system control boards 105(1) and 105(2) configure the crossbar switches 300, 305, 310 over the console connections 328(1), 328(2), in a manner more fully described below.

Note that, in the illustrated embodiment, the computing system 100 has a synmetrical physical arrangement. That is, half of the system board sets 110(1)–110(n) are physically located on one side of the centerplane 115, and the other half of the system board sets 110(1)–110(n) are physically located on the opposite side of the centerplane 115. In one particular implementation, n=18, so that system board sets 110(1)–110(9) are on one side of the centerplane 115 and system board sets 110(10)–110(18) are on the other. Additionally, in the illustrated embodiment, the first system control board 105(1) and the second system control board 105(2) are diagonally positioned from each other relative to the centerplane 115. The symmetrical positioning of the boards 105(1), 105(2), 110(1)–110(n) in the illustrated manner may take advantage of the interface connections on both sides of the centerplane 115.

However, the invention is not limited to computing systems employing a symmetrical physical arrangement. Thus, in some alternative embodiments, the physical arrangement of the system control boards 105(1), 105(2), the centerplane 115, and the system board sets 110(1)–110(n) may be asymmetrical.

Figure 4:
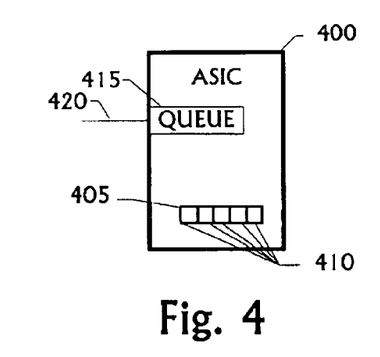
FIG. 4 generically illustrates the control bits, control registers, and output queues of an ASIC, such as may used to implement various aspects of the present invention.

The computing system 100 is also capable of operating in a "degraded mode" in accordance with the present invention. A "degraded mode" is a mode in which the computing system 100 operates with less efficiency responsive to the detection of some predetermined condition than it otherwise would in its "normal mode." In the normal mode of the illustrated embodiment, each individual signal path comprises two halves, and the information (including both control and payload information) for a given transaction is separated into two portions, each being transmitted on one half of the signal path as was previously discussed in reference to FIG. 3C. The ASICs 400, shown in FIG. 4, on the centerplane 115, and the system board sets 110(1)–110(n) are ordinarily configured to send and receive signals in this manner.

But, when desired, the active system control board 105(1) reconfigures one or more of the system domains to transmit both halves of the information, i.e., $MESSAGE_1$, $MESSAGE_2$, on a single half of the signal path. Furthermore, this is done dynamically, i.e., without having to reset the computing system 100. In accord with still another aspect of the inventions, such reconfiguration can be performed on only a subset of signal paths affected by the condition, as opposed to all signal paths. Thus, the individual crossbar switches 300, 305, 310, shown in FIG. 3A, are separately configurable.

Figure 5:
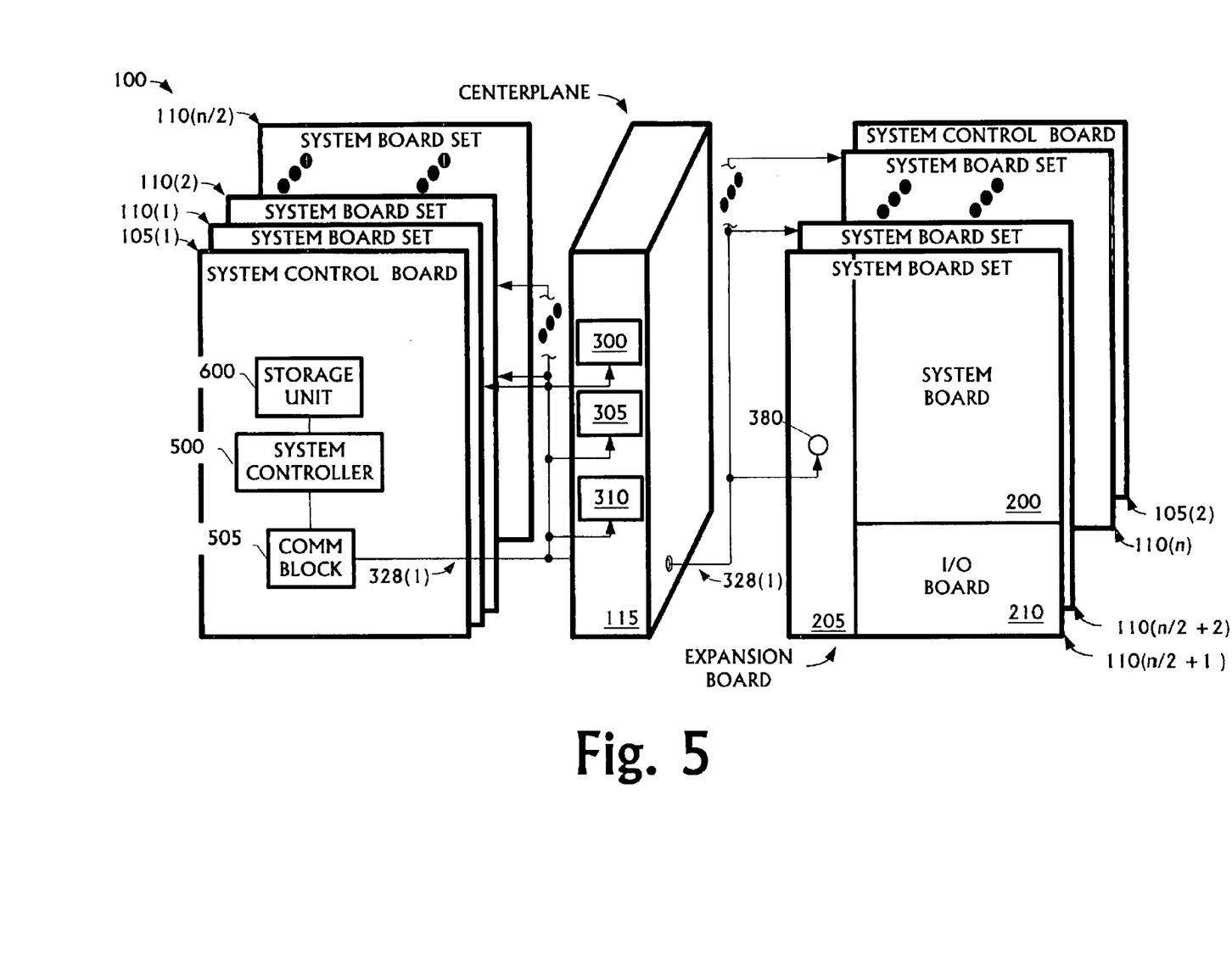
FIG. 5 illustrates in a stylized block diagram selected aspects of the embodiment of FIG. 1 and FIG. 2 employing the interconnect of FIG. 3A to FIG. 3D.

Assume, for purposes of illustration, that the computing system 100 has defined a plurality of system domains as shown in FIG. 5, and employs the dynamically reconfigurable interconnection of FIG. 3A to FIG. 3D. For ease of illustration, assume that in this implementation the system board sets 110(1)–110(n) have been defined into two separate domains 375(1), 375(2). The system domain 375(1) comprises the system board sets 110(1)–110(n/2) and the system domain 375(2) comprises the system board sets 110(n/2+1)–110(n). Note, again, however, that the invention is not so limited.

As part of defining the system domains 375(1), 375(2), the active system control board 105(1) configures each of the system domains 375(1), 375(2) to the "normal mode" of operation. As was noted above, each of the switches 380 and the crossbar switches 300, 305, 310, is implemented in one or more ASICs, such as the ASIC 400 shown in FIG. 4. Each ASIC 400 has one or more control registers 405 comprised of one or more bits 410. The bits 410 may be set or cleared over the console connection 328(1) by the system controller 500 to configure the ASIC for operation in either the normal mode or the degraded mode. Each of the ASICs 400 also includes an output queue 415 on each output line 420, whose function will be discussed further below.

Still referring to FIG. 5, the system controller 500 sends configuration commands over the console connection 328(1) through the communications block 505. The communications block 505 translates the configuration commands from the system controller 500 to the protocol employed by the ASICs 400 of the centerplane 115 and system board sets 110(1)–110(n). The configuration commands essentially tell the ASICs the number of cycles a single transaction will take on their respective signal path. The crossbar switches 300, 305, and 310, in the illustrated embodiment, each have one control bit for each port 335(1)–335(n) and 340(1)–340(n), as shown in FIG. 3B. The system controller 500 sets these bits, after which the ports 335(1)–335(n) and 340(1)–340(n) expect each transaction to last a predetermined number of cycles, e.g., two cycles. Similarly, each port in the switch 380 has a control bit that is set, after which the ports will expect each transaction to last a predetermined number of cycles. Thus, both messages are transmitted through the same multiplexer (not shown) onto one half of the individual signal path, e.g., 347(1) or 347(2).

The computing system 100 periodically, or upon user prompt, determines whether alterations are to be made to the system domain definition. More particularly, in accordance with one aspect of the present invention, the computing system 100 reconfigures one or more of the affected system domains 375(1), 375(2) from normal mode to degraded mode or from degraded mode to normal mode. The reconfiguration occurs upon the detection of a predetermined condition. The computing system 100 might wish to reconfigure the system domain definition for a variety of reasons, such as:

a failure may be detected in one or more of the system domains;

a previously detected failure may need to be repaired, or a system domain having a failure may be taken off-line so that other system domains do not have to be reconfigured to a degraded mode to communicate with it.

This list is illustrative only, and is neither compulsory nor exhaustive for the practice of the invention. The conditions under which the system domain definition is altered will be implementation specific.

Thus, when the decision is made to reconfigure, the computing system 100 proceeds to modify one or more existing system domains. This, in turn, reconfigures the signal paths. Both the system domains 375(1), 375(2) affected by the predetermined condition and those system domains 375(1), 375(2) communicating with those affected system domains 375(1), 375(2) are reconfigured. In other words, referring again to FIG. 3C, the switches 380 on both ends of the signal path 345, in addition to the data crossbar switch 300, are reconfigured from the normal mode to the degraded mode. This is true, in the illustrated embodiment, also of the response and address interconnects. Thus, a system domain 375(1), 375(2) may be "affected" by the predetermined condition directly or by communicating with a system domain 375(1), 375(2) on the failed portion of the signal path. Note that, in some situations, only a single system domain 375(x) may be affected, in which case only that system domain 375(x) need be reconfigured.

The reconfiguration is much the same as the configuration discussed above. The system controller 500, shown in FIG. 6, on the active system control board 105(1) sets bit in the control registers 405 of the ASICs 400, shown in FIG. 4, in the affected system domains 375(1), 375(2) shown in FIG. 3A. However, instead of setting the bits 410 in the control registers 405 to configure the ASICs 400 in the normal mode, the bits 410 are set to configure the ASICs 400 in the degraded mode. Because this configuration/reconfiguration is performed from the active system control board 105(1) but effected in the individual system domains 375(1), 375 (2), the computing system 100 can reconfigure individual domains on a domain-by-domain basis. This permits increased performance in the event of a failure by permitting those portions of the computing system 100 unaffected by the failure to continue operating in the normal mode. Note also that detection of the predetermined condition may be made from within the affected system domain itself, or even from within an unaffected system domain.

Note that because, in the illustrated embodiment, the computing system 100 employs separate data, address, and response interconnects, the computing system 100 can reconfigure the signal paths independently. For instance, if the failure mentioned above occurs only on a portion of the data signal path, then only those portions of the system domain 375(1) on the data signal path need to be reconfigured. This, too, permits increased performance in the event of failure by permitting portions of the affected system domain that remain unaffected by the failure to continue operating in the normal mode.

However, as was noted above, some alternative embodiments might employ fewer than three signal paths. For instance, all data, address, and response information may, in some alternative embodiments, be transmitted over a single signal path. In these embodiments, this "independent reconfiguration" aspect is not available. Furthermore, the independent reconfiguration might be implemented to less than all the signal paths. Some embodiments may, for example, allow the response interconnect to be reconfigurable independently of the data and address interconnects, but require the address and signal paths to be configured the same.

Referring again to both FIG. 3B and FIG. 4, each ASIC 400 includes one control bit 410 for each receiving port 335(1)–335(n) and each transmitting port 340(1)–340(n). In reconfiguration, the bit 410 for the receiving ports 335(1)–335(n) and the transmitting ports 340(1)–340(n) on the failed signal path are set to reconfigure them. The reconfiguration turns is off the receiving port 335(1)–335(n) and the transmitting port 340(1)–340(n) in the half 330(1), 330(2) of the crossbar switch 300, 305, 310 because it is on the failed half of the signal path. The reconfiguration of the corresponding receiving port 335(1)–335(n) and the transmitting port 340(1)–340(n) in the other half 330(1), 330(2) tells the port that transaction will now last twice as many cycles. Similarly, the data switch 350 and/or the response/address switch 355, depending on the location of the failure, are reconfigured by setting the bits 410 in the control registers 405 of the ASICs 400. Again, this reconfiguration is performed by the system controller 500 on the system control board 105(1) over the console connection 328(1). This reconfiguration "tells" the ASICs that each transaction will last twice as many cycles.

In the illustrated embodiment, the computing system 100 "dynamically," reconfigures one or more of the signal paths upon detecting a predetermined condition, i.e., it reconfigures without resetting. At the time the reconfiguration commences, the queues 415 (shown in FIG. 4) in the ASICs 400 of the switches 380 contain messages and are waiting to send to the respective crossbar switch 300, 305, 310, and other queues 415 in the ASICs 400 of the crossbar switches 300, 305, 310 themselves. Transactions waiting in the queues 415 of the switches 380 are not yet constrained to be sent in one mode or the other, but transactions that are in the queues 415 of the crossbar switches 300, 305, 310, as well as those in transit, have already been sent in a particular mode and must complete in that mode. Thus to change modes, transactions are prevented from leaving the queues 415 of the switches 380, while the queues 415 in the affected crossbar switches 300, 305, 310 for the affected system domains are completely drained. Once all the queues 415 in the affected crossbar switches 300, 305, 310 are drained, the active system control board 105(1) reconfigures the ASICs 400 of the affected switches 300, 305, 310, 380 to the degraded mode.

More concretely, referring again to the data interconnect 345 of FIG. 3C, assume a failure has occurred on the signal path 347(1) between the system board set 110(1) such that the half 360(2) is inoperable. Data transactions queued in the switch 380 on the system board set 110(1) are prevented from leaving the switch 380, while queued transactions on the ports 335(1), 335(2) drain. The switch 380 is then reconfigured, as is the port 335(1), to transmit both messages on the data path 360(1). The transactions queued in the switch 380 are then allowed to proceed, but in the degraded mode. Note that the rest of the data interconnect 345 continues to operate in a normal mode, as do the response and address interconnects, so long as they are not affected by the failure.

In one particular implementation, transactions are prevented from leaving the queues 415 of the switch 380 by simply pausing the operation of the ASICs 700. While the queues are paused, memory transactions within the computing system 100 will not complete. It is possible that some I/O devices will have been built or programmed in a manner such that their operations can fail because transactions do not complete in a timely fashion. If this situation may exist, the system controller 500 must first warn the operating system of the impending pause, so that the operating system will quiesce IO operations. This will put the IO in an inactive state such that a pause will not cause a failure.

If more than one of the data, address, and response interconnects is to be reconfigured, consideration should be given to deadlock conditions. Deadlock is avoided by draining the queues 415 of the affected crossbar switches 300, 305, 310 in a particular order—namely, by draining the address queues 415 before the response queues 415 and draining the response queues 415 before the data queues 415. Alternatively, some implementations can simply chance that a deadlock will not occur, disable the affected signal path(s), and check that the draining of the queues completes in a timely fashion. If a deadlock occurs, the affected signal path(s) can be re-enabled for a short predetermined period of time. The system controller 500 on the system control board 105(1) can then dynamically reconfigure when the draining of the queues has succeeded. Since the probability of a deadlock is relatively low, the reconfiguration should occur with only a few tries. Once the reconfiguration is complete, the affected signal path(s) are then re-enabled and operations resume in the degraded mode.

Note that this reconfiguration must be performed for all "affected" signal paths, which each signal path in the interconnect for the SOCSBS. Consider an implementation (not shown) wherein the computing system 100 is partitioned into three system domains as follows: system domain A includes resources from the system board sets 110(0)–110(2), system domain B includes resources from the system board sets 110(2)–110(4), and system domain C includes resources from the system board sets 110(5)–110(6). Note that system board set 110(2) is in a "split" or "split expander" configuration. If a failure on the response interconnect, for example, to system board set 110(4) has caused system domain B to crash, all the system board sets 110(1)–(6) are reconfigured to degraded mode on the response interconnect because they are all in the same SOCSBS. System board sets 110(2)–110(4) are all in the same mode because they are in the same domain so talk to each other. Since system board set 110(2) is degraded, system board sets 110(0), 110(1) are degraded so that domain A will work. System board sets 110(5) and 110(6) are also degraded so that system domain C can still talk to A.

In accordance with yet another aspect of the present invention, interconnects and system domains operating in a degraded mode can be dynamically reconfigured to a normal mode. The reconfiguration process is essentially the same, except that the ASICs 400 are reconfigured so that the two messages are no longer transmitted on the same half of the signal path, but instead on respective halves of the signal path. Just as the entire SOCSBS, i.e., all affected signal paths and system domains, is reconfigured to the degraded mode, so, too, is the SOCSBS reconfigured to the normal mode. However, the reconfiguration is otherwise the same-to change modes, transactions are prevented from leaving the queues 415 of the switches 380, while the queues 415 in the affected crossbar switches 300, 305, 310 for the affected system domains are completely drained. Once all the queues 415 in the affected crossbar switches 300, 305, 310 are drained, the active system control board 105(1) reconfigures the ASICs 400 of the affected switches 300, 305, 310, 380 to the normal mode.

However, the present invention is not limited to dynamic reconfiguration, and reconfiguration can be performed upon reset. Resetting is generally considered undesirable in a computing system such as the computing system 100. However, some failures will automatically cause a reset because they are incurable. The present invention can also be implemented in the context of these types of failures.

As will be appreciated by those skilled in the art having the benefit of this disclosure, the computing system 100, on reset, performs a number of tests. These tests include a power-on self test ("POST") and a number of built-in self-tests ("BISTs"). The error checking described above is performed in the course of this testing as a routine matter. When the failure is detected, the affected system domains 375(1)–375(n) can be reconfigured as discussed above, either on a system domain-by-system domain basis or across the computing system 100 as a whole. Similarly, the reconfiguration may be performed in either of the implementations mentioned above to address potential deadlocks.

In accordance with yet another aspect of the present invention, interconnects and system domains operating in a degraded mode can be dynamically reconfigured to a normal mode. The reconfiguration process is essentially the same, except that the ASICs 400 are reconfigured so that the two messages are no longer transmitted on the same half of the signal path, but instead on respective halves of the signal path. Just as the entire SOCSBS, i.e., all affected signal paths and system domains, is reconfigured to the degraded mode, so, too, is the SOCSBS reconfigured to the normal mode. However, the reconfiguration is otherwise the same—to change modes, transactions are prevented from leaving the queues 415 of the switches 380, while the queues 415 in the affected crossbar switches 300, 305, 310 for the affected system domains are completely drained. Once all the queues 415 in the affected crossbar switches 300, 305, 310 are drained, the active system control board 105(1) reconfigures the ASICs 400 of the affected switches 300, 305, 310, 380 to the normal mode.

Figure 6:
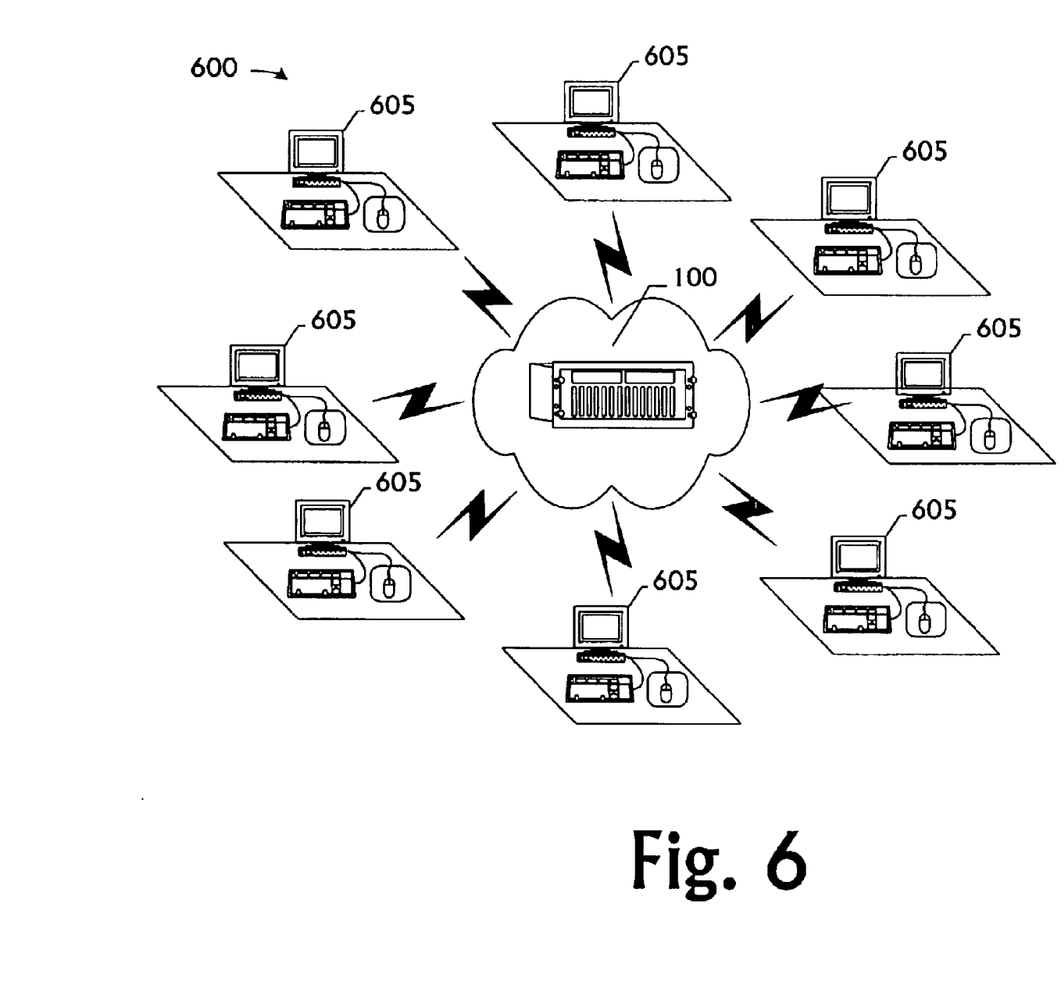
FIG. 6 illustrates a networked computing system in which the computing system of FIG. 1 functions as a server in a server/client network architecture.

One particular use for the computing system 100 is as a server in a network server/client architecture. FIG. 6 conceptually illustrates one such network 600. The computing system 100 is a server in the network 600. The network 600 may be a network of any size, including a local area network ("LAN"), a wide area network ("WAN"), a system or storage area network ("SAN"), an intranet, or even a portion of the Internet. The clients 605 in the network 600 are workstations, such as a Sun UltraSPARC™ workstation (e.g., from the Sun Blade™ or the Ultra™ line of workstations). However, the invention is not so limited and the clients 605 may be implemented in notebook, desktop, mini-, or even mainframe computers.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for reconfiguring a signal path in a computing system including a plurality of system domains, the method comprising:

detecting a predetermined condition triggering a reconfiguration of the computing system;

reconfiguring a signal path affected by the condition from a first mode to a second mode responsive to detecting the condition;

leaving the unaffected system domains configured in the first mode; and     operating the affected system domains in the second mode and the unaffected system domains in the first mode;

wherein: operating the unaffected system domains in the first mode includes separating a plurality of information in each transaction into two messages and transmitting the two messages in parallel, each on a respective half of the signal paths; and operating the affected system domains in the second mode includes transmitting the messages in series on a single half of the affected signal path.

2. The method of claim 1, wherein detecting the predetermined condition includes detecting an interconnect failure.

3. The method of claim 1, wherein the computing system includes at least one system control board and wherein detecting the predetermined condition includes detecting a failure from the system control board.

4. The method of claim 1, wherein detecting the predetermined condition includes detecting a failure from the affected system domain.

5. The method of claim 4, wherein the computing system includes at least one system control board and the method further comprises notifying the system control board of the failure from the affected system domain.

6. The method of claim 1, wherein detecting the predetermined condition includes detecting a failure during first operations.

7. The method of claim 1, wherein detecting the predetermined condition includes detecting a failure upon reset.

8. The method of claim 1, wherein configuring the affected system domains includes: configuring a first switch in a first affected domain defining a first end of the affected signal path from the first to the second mode; configuring a crossbar switch defining a second end for the affected signal path from the first mode to the second mode.

9. The method of claim 1, wherein the computing system includes a system control board and configuring the affected system domains includes configuring the system domains from the system control board.

10. The method of claim 1, further comprising at least one of: defining the system domains; pausing operations after detecting the failure but before reconfiguring the affected system domain; and resetting the computing system after detecting the failure but before reconfiguring the affected system domain.

11. The method of claim 1, wherein dynamically reconfiguring a signal path affected by the condition from a first mode to a second mode includes dynamically reconfiguring the signal path affected condition from a normal mode to a degraded mode.

12. A method for reconfiguring a signal path in a computing system including a plurality of system domains, the method comprising:

detecting a predetermined condition triggering a reconfiguration of the computing system;

reconfiguring a signal path affected by the condition from a first mode to a second mode responsive to detecting the condition;

leaving the unaffected system domains configured in the first mode; and operating the affected system domains in the second mode and the unaffected system domains in the first mode;

wherein: operating the unaffected system domains in the first mode includes separating a plurality of information in each transaction into two messages and transmitting the two messages in parallel in a predetermined number of cycles; and operating the affected system domains in the second mode includes transmitting the plurality of information in each transaction in a single message in twice the predetermined number of cycles.

13. A computing system, comprising:

a plurality of system domains;

a centerplane interconnecting the system domains; and a system controller capable of detecting a condition triggering a reconfiguration and reconfiguring a signal path affected by the condition from a first mode to a second mode;

wherein the centerplane comprises a plurality of crossbar switches interconnecting the system domains; and wherein the plurality of crossbar switches includes: a data crossbar switch; an address crossbar switch; and a response crossbar switch.

14. The computing system of claim 13, wherein the system domains are dynamically configured.

15. The computing system of claim 13, wherein each system domain includes: a system board; an expansion board; and an I/O board.

16. The computing system of claim 15, wherein the system board, expansion board, and I/O board comprise a system board set.

17. A computing system, comprising:

a plurality of system domains;

a plurality of signal paths among the system domains; and a system controller capable of detecting a condition triggering a reconfiguration and dynamically reconfiguring a signal path affected by the condition from a first mode to a second mode;

wherein the computing system further comprises a centerplane including a plurality of crossbar switches interconnecting the system domains; and wherein the plurality of crossbar switches includes: a data crossbar switch; an address crossbar switch; and a response crossbar switch.

18. The computing system of claim 17, wherein the system domains are dynamically configured.

19. The computing system of claim 17, wherein each system domain includes: a system board; an expansion board; and an I/O board.

20. The computing system of claim 19, wherein the system board, expansion board, and I/O board comprise a system board set.

21. The computing system of claim 17, wherein the plurality of signal paths includes: a plurality of data signal paths; a plurality of address signal paths; and a plurality of response signal paths.

22. The computing system of claim 17, wherein each signal path terminates at a first end in a first one of the system domains, routes through the crossbar switch, and terminates at a second end in a second one of the system domains.

23. The computing system of claim 22, wherein the system domains and the signal paths are configurable by configuring the first end, the second end, and the crossbar switch.

24. A computing system, comprising:

a plurality of system domains;

a plurality of signal paths among the system domains; and a system controller capable of detecting a condition triggering a reconfiguration and dynamically reconfiguring a signal path affected by the condition from a first mode to a second mode;

wherein each signal path comprises: a first half capable of transmitting a first message containing a first portion of the information in a given transaction in a normal mode; and a second half capable of transmitting a second message containing a second portion of the information in the transaction in the normal mode.

25. The computing system of claim 24, wherein both the first and second halves are capable of transmitting a single message containing both the first and second portions in a degraded mode.

26. A computing system, comprising:

a system controller;

a plurality of system domains;

at least one crossbar switch interconnecting the system domains;

a plurality of signal paths, each signal path terminating at a first end in a first one of the system domains, routing through the crossbar switch, and terminating at a second end in a second one of the system domains; and a console connection over which the system controller can, responsive to a condition triggering a reconfiguration, reconfigure a plurality of the system domains affected by the condition and the crossbar switch to operate the affected signal paths in a first mode while the signal paths domains unaffected by the failure operate in a second mode;

wherein each signal path comprises: a first half capable of transmitting a first message containing a first portion of the information in a given transaction in a normal mode; and a second half capable of transmitting a second message containing a second portion of the information in the transaction in the normal mode.

27. A computing system, comprising:

a plurality of system boards from which a plurality of system domains can be defined;

a centerplane including at least one crossbar switch interconnecting the system domains to provide a plurality of signal paths among the system boards; and a system control board hosting a system controller capable of defining the system domains, configuring the system domains and the crossbar switch to operate the signal paths in a first mode, and, responsive to a condition triggering a reconfiguration, reconfiguring the affected system domains and the crossbar switch to operate the affected signal paths in a second mode while the unaffected signals paths operate in the first mode;

wherein each signal path comprises: a first half capable of transmitting a first message containing a first portion of the information in a given transaction in a normal mode; and a second half capable of transmitting a second messaae containing a second portion of the information in the transaction in the normal mode.

* * * * *